(12) United States Patent
Furui

(10) Patent No.: US 7,993,013 B2
(45) Date of Patent: Aug. 9, 2011

(54) DISTORTION CORRECTION FOR PROJECTOR

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 12/437,965

(22) Filed: May 8, 2009

(65) Prior Publication Data
US 2009/0279000 A1 Nov. 12, 2009

Related U.S. Application Data

(63) Continuation of application No. 11/395,280, filed on Apr. 3, 2006, now Pat. No. 7,549,754.

(30) Foreign Application Priority Data

Apr. 6, 2005 (JP) ................................. 2005-109613

(51) Int. Cl.
*G03B 21/14* (2006.01)
(52) U.S. Cl. ............................ 353/70; 353/101; 353/121
(58) Field of Classification Search .................... 353/69, 353/70, 101, 121, 122
See application file for complete search history.

(56) References Cited

U.S. PATENT DOCUMENTS

| | | | |
|---|---|---|---|
| 6,367,933 B1 | 4/2002 | Chen et al. | |
| 6,530,666 B1 | 3/2003 | Smith et al. | |
| 6,932,480 B2 | 8/2005 | Wada et al. | |
| 7,125,122 B2 | 10/2006 | Li et al. | |
| 7,163,296 B2 * | 1/2007 | Sakai | 353/69 |
| 7,175,285 B2 | 2/2007 | Li et al. | |
| 7,233,370 B2 | 6/2007 | Itaki | |
| 7,252,387 B2 | 8/2007 | Raskar et al. | |
| 7,309,133 B2 | 12/2007 | Miyasaka | |
| 2003/0210381 A1 | 11/2003 | Itaki | |

FOREIGN PATENT DOCUMENTS

| | | |
|---|---|---|
| JP | A-2001-069433 | 3/2001 |
| JP | A-2002-72351 | 3/2002 |
| JP | A-2004-341029 | 12/2004 |

* cited by examiner

*Primary Examiner* — William C Dowling
(74) *Attorney, Agent, or Firm* — Oliff & Berridge, PLC

(57) ABSTRACT

An image processing device for a projector including an image formation section that emits light of an image, and a projection system that projects the emitted light onto a projection surface. The image processing device has a distortion correction technique for images displayed on the projection surface. The image processing device has a target display area determination section that determines, in a display area serving as a reference on the projection surface, based on a current value of a parameter, any of target display areas set for values possibly taken by the parameter within an allowable range to be targeted on a distortion-free image for display on the projection surface; a reference formation area determination section that determines a reference formation area to be formed with a virtual distorted image and a correction application section that generates corrected image data for supply to the image formation section.

8 Claims, 19 Drawing Sheets

TELE SIDE     IN-BETWEEN     WIDE-SIDE

MAGNIFICATION: LOW  MAGNIFICATION: INTERMEDIATE  MAGNIFICATION: HIGH

MAGNIFICATION: LOW  MAGNIFICATION: INTERMEDIATE  MAGNIFICATION: HIGH

DISTORTION CORRECTION FOR PROJECTOR

This is a Divisional of U.S. patent application Ser. No. 11/395,280 filed on Apr. 3, 2006, which is hereby incorporated by reference in its entirety. This application claims priority to Japanese Patent Application No. 2005-109613 filed Apr. 6, 2005, which is hereby incorporated by reference in its entirety.

BACKGROUND

1. Technical Field

The present invention relates to image processing for projectors and, more specifically, to a distortion correction technique for images to be displayed on projection surfaces.

2. Related Art

Projectors generally display images from a low angle onto projection surfaces. With such low-angle image projection, the resulting images displayed on the projection surfaces suffer from distortion. For this reason, in a projector of Patent Document 1 (JP-A-2002-72351), any distorted image is formed in an internally-provided image formation section exemplified by a liquid crystal light valve so that the resulting image to be displayed on the projection surface becomes free from distortion. Note here that the low-angle image projection denotes the projection technique in which the light source optical axis of a projector is not vertical to a projection surface.

With such a previously-known technique, however, there still remains a difficulty in correcting image distortion with accuracy for display on the projection surface.

For distortion correction of images for display on projection surfaces, there originally needs to give consideration to image display areas on the projection surfaces, more specifically, to image display positions and sizes on the projection surfaces. The determination factor for the image display areas is the shift and zoom positions of a projection system, the position and magnification of distorted images to be formed in an image formation section, and the like. However, no consideration has been given to such image display areas, and in Patent Document 1, there is indeed a description of changing the shape of an image formed on a liquid crystal panel depending on the position of a projection lens, but there is no disclosure about the specific technique of making such changes.

SUMMARY

An advantage of some aspects of the invention is to accurately correct any distortion observed in images to be displayed on projection surfaces.

A first aspect of the invention is directed to an image processing device for a projector including an image formation section that emits light of an image, and a projection system that projects the emitted light onto a projection surface. The image processing device includes: a target display area determination section that determines, in a display area serving as a reference on the projection surface, based on a current value of a parameter, any of target display areas set for values possibly taken by the parameter within an allowable range to be targeted on a distortion-free image for display on the projection surface; a reference formation area determination section that determines, corresponding to the reference display area, based on information about a projection angle of the projector with respect to the projection surface, a reference formation area to be formed with a virtual distorted image that is supposed to be formed in the image formation section when the distortion-free image is displayed in the reference display area; and a correction application section that generates corrected image data for supply to the image formation section by correcting any provided original image data to form a target distorted image in a target formation area, which corresponds to the target display area as is defined by the relationship between the reference display area and the reference formation area, and is formed with the target distorted image that is supposed to be formed in the image formation section when the distortion-free image is displayed in the target display area.

With such an image processing device of the first aspect, any original image data is so corrected that a target distorted image is formed in a target formation area, which is defined by the relationship between a reference display area and a reference formation area, and the generation result is corrected image data. That is, in this image processing device, the corrected image data is generated with consideration given to the target display area that is determined based on the current value of a parameter so that any distortion observed in images can be corrected with accuracy for display on a projection surface.

In the image processing device of the first aspect, the parameter preferably includes the shift position of the projection system indicating the layout of the projection system in a direction orthogonal to an axis passing through the center of an image formation surface of the image formation section.

When the shift position of the projection system is changed, the target display area is also changed in position. Accordingly, by the parameter including the shift position of the projection system as above, the corrected image data can be generated with consideration given to the target display area corresponding to the shift position of the projection system.

In the image processing device of the first aspect, the parameter preferably includes the zoom position of the projection system indicating the layout of the projection system in a direction parallel to an axis passing through the center of an image formation surface of the image formation section.

When the zoom position of the projection system is changed, the target display area is also changed in position. Accordingly, by the parameter including the zoom position of the projection system as above, the corrected image data can be generated with consideration given to the target display area corresponding to the zoom position of the projection system.

The image processing device of the first aspect may further include a target formation area determination section that determines the target formation area corresponding to the target display area based on the relationship between the reference display area and the reference formation area.

In the image processing device of the first aspect, when the target formation area does not fit in the image formation section, the target formation area determination section changes the position of the target display area to ensure a fit in the image formation section, and based on the relationship between the reference display area and the reference formation area, newly determines the target formation area corresponding to the target display area after the position change.

Alternatively, in the image processing device of the first aspect, the projector may further include an actuator for changing the shift position of the projection system. When the target formation area does not fit in the image formation section, the target formation area determination section may change the position of the target formation area to ensure a fit in the image formation section, and make the actuator change the shift position of the projection system to ensure an image display in the target display area.

When the target formation area does not fit in the image formation section, the resulting image is not fully displayed on the projection surface. With the above being the case, however, the resulting image can be fully displayed on the projection surface, and any distortion observed in the image can be corrected with accuracy for display on the projection surface.

In the image processing device of the first aspect, the parameter preferably includes the position of the target distorted image that is supposed to be formed in the image formation section.

When the target distorted image to be formed in the image formation section is changed in position, the target display area is also changed. Accordingly, by the parameter including the position of the target distorted image as above, the corrected image data can be generated with consideration given to the target display area corresponding to the position of the target distorted image in the image formation section.

In the image processing device of the first aspect, the parameter preferably includes the magnification of the target distorted image that is supposed to be formed in the image formation section.

When the target distorted image to be formed in the image formation section is changed in magnification, the target display area is also changed. Accordingly, by the parameter including the magnification of the target distorted image as above, the corrected image data can be generated with consideration given to the target display area corresponding to the magnification of the target distorted image in the image formation section.

Note here that the invention can be embodied in various forms, including an image processing device and method, a projector equipped with the image processing device and an image processing method therefor, a computer program for implementing functions of an image processing device, a recording medium recorded with the computer program, computer-programmed data signals embodied in carriers, and others.

BRIEF DESCRIPTION OF THE DRAWINGS

The invention will be described with reference to the accompanying drawings, wherein like numbers reference like elements.

FIGS. 11A-1 to 11B-2 are each an illustrative diagram showing a first process when the target formation area does not fit in the liquid crystal light valve.

FIGS. 12A-1 to 12B-2 are each an illustrative diagram showing a second process when the target formation area does not fit in the liquid crystal light valve.

DESCRIPTION OF EXEMPLARY EMBODIMENTS

A. First Embodiment

A-1. Configuration of Projector

Figure 1:
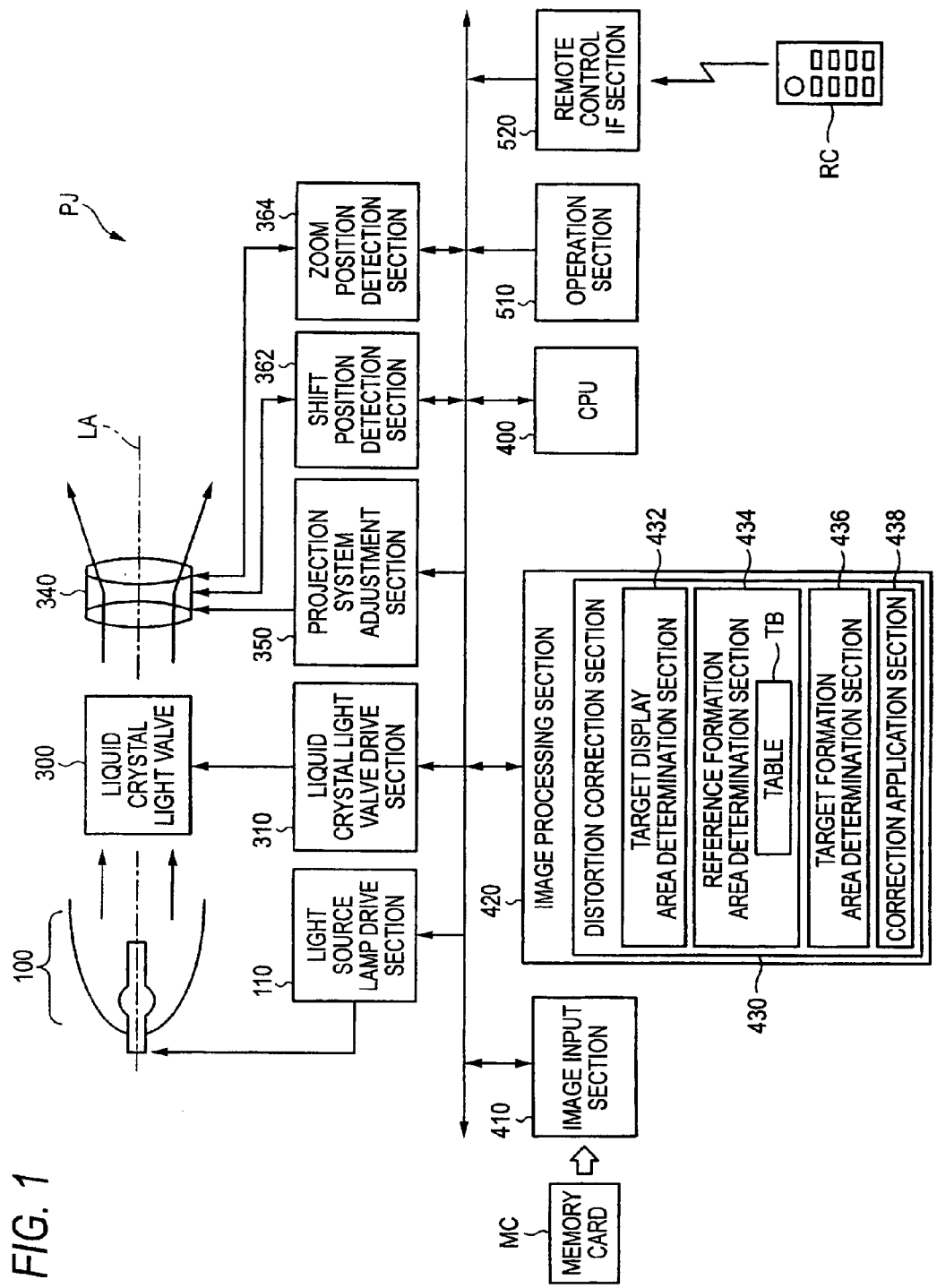
FIG. 1 is a block diagram showing the configuration of a projector PJ in a first embodiment.

FIG. 1 is a block diagram showing the configuration of a projector PJ in a first embodiment. The projector PJ is configured to include an illumination system 100, a liquid crystal light valve 300, and a projection system 340. In FIG. 1, the optical system is shown quite simplified.

The projector PJ also includes a light source lamp drive section 110, a liquid crystal light valve drive section 310, a projection system adjustment section 350, a shift position detection section 362, a zoom position detection section 364, a CPU (Central Processing Unit) 400, an image input section 410, an image processing section 420, an operation section 510, and a remote control interface (IF) section 520. The CPU 400 is in charge of exercising control over the projector.

The light source lamp drive section 110 drives a light source lamp included in the illumination system 100. The liquid crystal light valve drive section 310 drives the liquid crystal light valve 300 in accordance with image data coming from the image processing section 420.

The projection system adjustment section 350 is equipped with a motor, and adjusts the position of the projection system 340. More specifically, the projection system adjustment section 350 moves the lens of the projection system in the direction orthogonal to the light source optical axis LA so that the projection system is adjusted by shift position. The projection system adjustment section 350 also moves the lens of the projection system in the direction parallel to the light source optical axis LA so that the projection system is adjusted by zoom position. Note that the light source optical axis denotes the center axis of light coming from the illumination system 100, and the light source optical axis passes through the center of an effective display area (image formation surface) of the liquid crystal light valve 300.

The shift position detection section 362 detects the shift position of the projection system. The zoom position detection section 364 detects the zoom position of the projection system. Note here that as the shift position detection section and the zoom position detection section, any well-known position detection means can serve well, e.g., rotary encoder, or variable resistor.

The image input section 410 supplies any externally-provided image data to the image processing section 420. For example, the image input section 410 receives an RGB signal provided by a computer, a composite signal provided by a video recorder, and the like, and supplies image data to the image processing section 420. The image input section 410 reads image data stored in a memory card MC for supply to the image processing section 420.

The image processing section 420 processes the image data provided by the image input section 410, and the generation result is processed image data. The image processing section 420 supplies the processed image data to the liquid crystal light valve drive section 310.

The image processing section 420 specifically includes a computer program serving as the distortion correction section 430. The distortion correction section 430 is configured to include a target display area determination section 432, a reference formation area determination section 434, a target formation area determination section 436, and a correction application section 438. The distortion correction section 430 functions by the CPU 400 executing the computer program. Note here that the computer program is distributed in a computer-readable recording medium such as CD-ROM.

As described above, when low-angle image projection is made on the screen, the image formed on the liquid crystal light valve 300 has no distortion but the image displayed on the screen suffers from substantially-trapezoidal distortion. On the other hand, if a substantially-trapezoidal distorted image is formed on the liquid crystal light valve 300, the resulting image on the screen becomes free from distortion, i.e., rectangular image of a correct aspect ratio. Such a rectangular image is hereinafter simply referred also to as regular image. The distortion correction section 430 corrects the original image data, and the generation result is corrected image data representing a distorted image. In accordance with the corrected image data, a distorted image is formed on the liquid crystal light valve 300 so that a regular image is displayed on the screen.

The operation section 510 makes the CPU 400 execute various types of processes in response to the user's operation. For example, through operation of the operation section 510, a user can display a menu screen on the screen. By following the menu screen, the user can make various types of settings such as image contrast.

Similarly to the operation section 510, the remote control IF section 520 makes the CPU 400 execute various types of processes in response to the user's operation of a remote controller RC.

A-2. Image Distortion on Screen Display

Figure 2A:
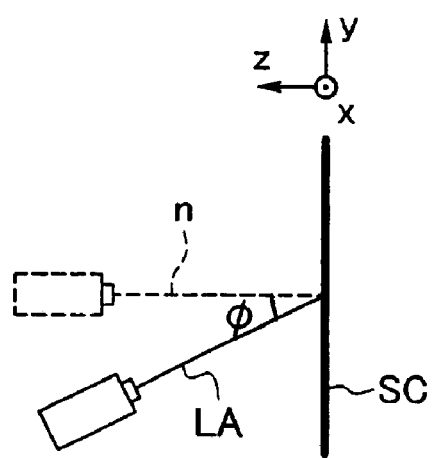
FIGS. 2A and 2B are each an illustrative diagram showing a projection angle of the projector PJ.
Figure 2B:
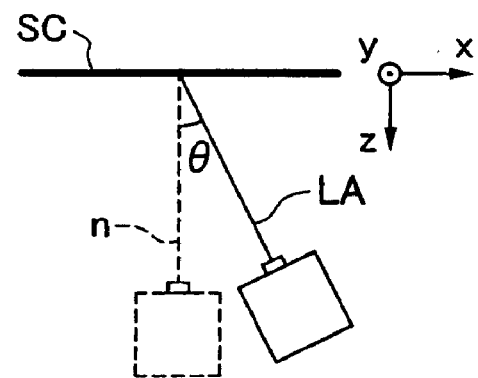

FIGS. 2A and 2B are each an illustrative diagram showing the relationship between the projector PJ and a screen SC. In FIGS. 2A and 2B, the screen SC is disposed along the xy plane, and the projector PJ is assumed to radiate light toward the side of z of the screen. As shown in FIG. 2A, the tilt angle of the projector PJ is represented by an angle $\phi$, formed by the normal n of the screen SC and the light source optical axis LA of the projector. As shown in FIG. 2B, the pan angle of the projector PJ is represented by an angle $\theta$, formed by the normal n of the screen SC and the light source optical axis LA of the projector. When the tilt angle $\phi$ or the pan angle $\theta$ is not 0 degree, the low-angle image projection is implemented.

Some type of projector is designed to realize the low-angle image projection in the initial state. More specifically, a significant tilt angle $\phi i$ is sometimes set in the initial state of some type of projector. With this being the case, the tilt angle $\phi$ of FIG. 2A is, actually, represented by the sum of the angle $\phi i$ in the initial state and a user-set angle $\phi u$. Herein, the angle $\phi u$ is user-changeable through adjustment of the leg height of the projector, for example.

When the low-angle image projection is made onto a screen, if a distorted image is formed on a liquid crystal light valve before a projection system is changed in position for the purpose of displaying a regular image on the screen, i.e., before the shift and zoom positions of the projection system are changed, the resulting image on the screen is distorted. This is caused because the image display area on the screen is changed as the projection system is changed in position.

Figure 3A:
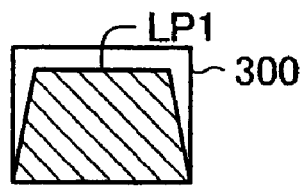
FIGS. 3A and 3B are illustrative diagrams showing, respectively, an image formed on a liquid crystal light valve, and an image displayed on a screen based on the shift position of a projection system.
Figure 3B:
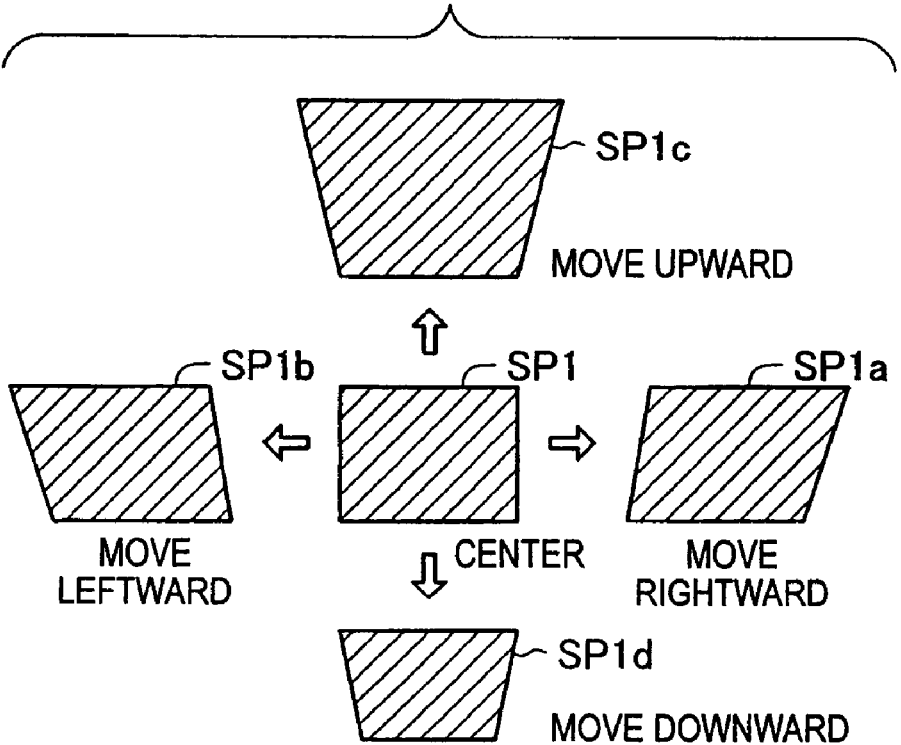

FIGS. 3A and 3B are illustrative diagrams showing, respectively, an image formed on a liquid crystal light valve, and an image displayed on a screen based on the shift position of a projection system.

Considered here is a case where the shift position of the projection system 340 is located at the center, more specifically, a case where the shift position is so set that the light source optical axis coincides with the center axis of the projection system 340. In such a case, when the liquid crystal light valve 300 is formed with a trapezoidal distorted image LP1 of FIG. 3A, the screen displays an image SP1 of FIG. 3B.

If no change is made to the distorted image LPI formed on the liquid crystal valve 300 before the projection system 340 is changed in shift position, as shown in FIG. 3B, images SP1a to SP1d on the screen are all changed in position. As a result, the images SP1a to SP1d are all changed in shape. For example, when the shift position of the projection system is moved toward the right, in other words, when the image position on the screen is moved toward the right, the screen displays the distorted image SP1a extending to the right.

Figure 4A:
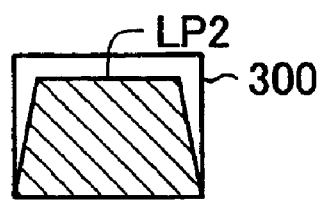
FIGS. 4A and 4B are illustrative diagrams showing, respectively, an image formed on the liquid crystal light valve, and an image displayed on the screen based on the zoom position of the projection system.
Figure 4B:
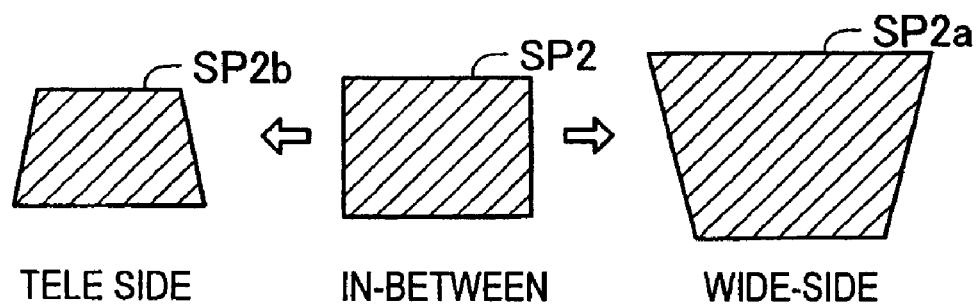

FIGS. 4A and 4B are illustrative diagrams showing, respectively, an image formed on a liquid crystal light valve, and an image displayed on a screen based on the zoom position of a projection system.

Considered here is a case where the zoom position of the projection system is located at an in-between position, more specifically, when the zoom position is located at between the wide-side and the tele-side. In such a case, when the liquid crystal light valve 300 is formed with a trapezoidal distorted image LP2 of FIG. 4A, the screen displays an image SP2 of FIG. 4B.

If no change is made to the distorted image LP2 formed to the liquid crystal valve 300 before the projection system 340 is changed in zoom position, as shown in FIG. 4B, images SP2a to SP2b on the screen are both changed in position. As a result, the images SP2a and SP2b are both changed in shape. For example, when the zoom position of the projection system is moved toward the wide-side, in other words, when the image size is increased for display on the screen, the screen displays the distorted image SP2a expanding upward.

As such, when the image display area on the screen is changed as the shift and/or zoom positions of the projection system are changed, the image displayed on the screen is changed in shape.

The issue here is that, when the distorted image is determined by shape for formation onto the liquid crystal light valve, no consideration has been given to the shift and zoom positions of the projection system. In other words, previously, the image display area on the screen has not been considered. Therefore, it has been difficult to display on the screen rectangular images (regular images) of a correct aspect ratio.

In consideration thereof, in the embodiment, in consideration of the image display area on the screen, i.e., in consideration of the shift and zoom positions of the projection system, a distorted image is determined by shape for formation to a liquid crystal light valve.

A-3. Correction of Image Distortion

Figure 5:
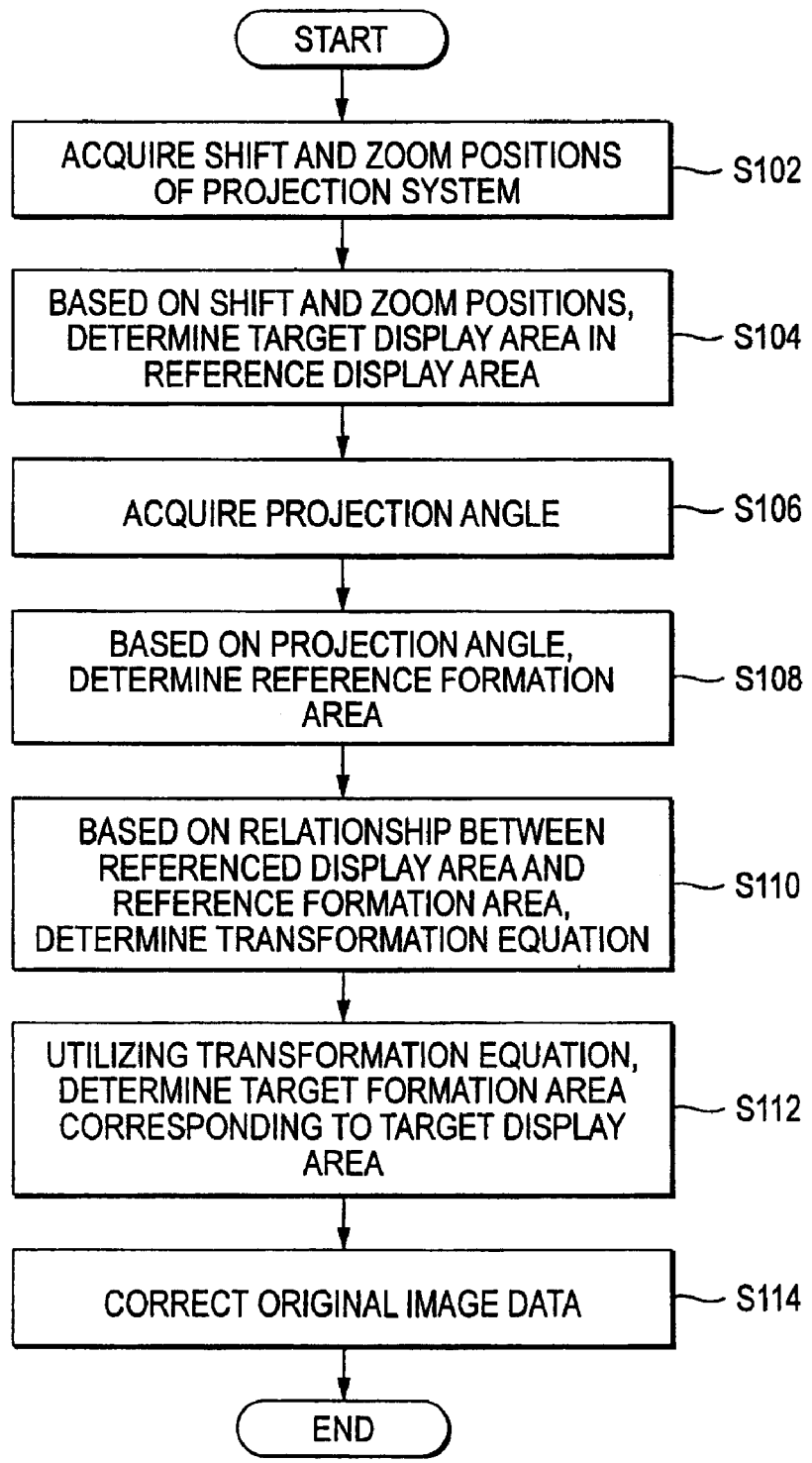
FIG. 5 is a flowchart showing the procedure of correcting any distortion observed in an image displayed on the screen.

FIG. 5 is a flowchart showing the procedure of correcting any distortion observed in an image displayed on a screen. The procedure of FIG. 5 is executed by the distortion correction section 430, and is started when a command is issued for a distortion correction process in response to the user operation of the operation section 510, for example. More specifically, the operation section 510 is provided with a plurality of correction buttons for correcting the shape of images to be projected for display. Every time the user operates any of such correction buttons, the CPU 400 makes the distortion correction section 430 execute the procedure of FIG. 5.

In step S102, the target display area determination section 432 acquires the shift and zoom positions of the projection system 340. More in detail, the target display area determination section 432 makes the shift position detection section 362 detect the shift position of the projection system 340 so that the resulting detection values (current values) are acquired. The target display area determination section 432 also makes the zoom position detection section 364 detect the zoom position of the projection system 340 so that the resulting detection values (current values) are acquired.

In this embodiment, the projection system adjustment section 350 is capable of adjusting the shift and zoom positions of the projection system 340 in response to user-issued commands. With this being the case, instead of the detection values, as the current values of the shift and zoom positions, the control values of the shift and zoom positions provided to the projection system adjustment section 350 may be acquired.

In step S104, based on the detection values (current values) of the shift and zoom positions of the projection system derived in step S102, the target display area determination section 432 determines a display area serving as a target of any image to be displayed on the screen.

Figure 6:
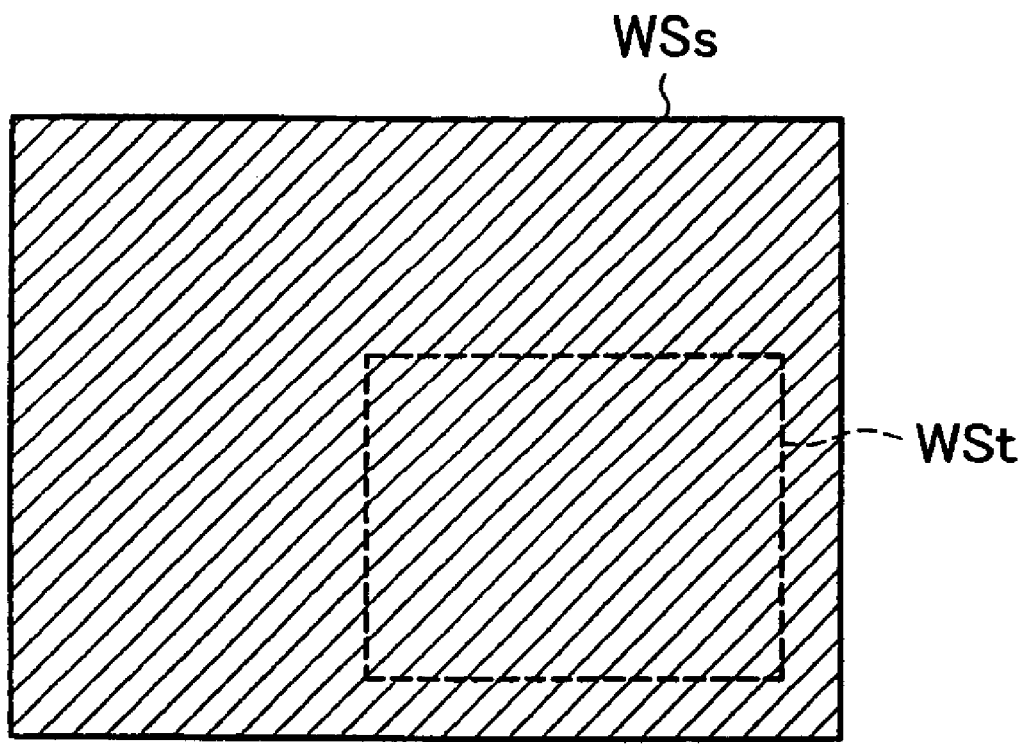
FIG. 6 is an illustrative diagram showing a target display area Wst.

FIG. 6 is an illustrative diagram showing a target display area WSt. FIG. 6 also shows a reference display area WSs including therein the target display area WSt. The reference display area WSs displays therein an image when the projection system is changed in shift and zoom positions in an allowable range. Note here that the size of the reference display area WSs is set irrespective of the projection angle of the projector, and is of the size when the tilt angle ϕ and the pan angle θ of the projector are both 0 degree. In this embodiment, the reference display area WSs is ready in advance based on the allowable range for the shift and zoom positions of the projection system. In step S104, based on the current values of the shift and zoom positions of the projection system, a target display area WSt is determined in the reference display area WSs. As is known from this, the reference display area WSs is an area including the target display areas corresponding to the shift and zoom positions in the allowable range of the projection system 340.

As shown in the drawing, the reference display area WSs and the target display area WSt are both rectangle shaped. The aspect ratio, i.e., dimension ratio of lateral to vertical, of the reference display area WSs is dependent on the allowable range of the shift and zoom positions of the projection system. The aspect ratio of the target display area WSt is the same as that of the liquid crystal light valve 300, e.g., in this embodiment, 4:3.

In step S106 of FIG. 5, the reference formation area determination section 434 acquires the projection angle of the projector. Inside of the projector, the user operation of a plurality of correction buttons provided to the operation section 510 is dealt as settings of the projection angle of the projector PJ with respect to the screen. For example, when the user depresses a specific correction button for once, the setting value of the tilt angle ϕ is increased by a predetermined angle. That is, in step S106, the reference formation area determination section 434 acquires the projection angles θ and ϕ of FIGS. 2A and 2B that are set by the user operation of any corresponding correction buttons.

Alternatively, the projection angle of the projector may be acquired by any other techniques. As an example, the projection angles ϕ and θ may be acquired based on any characteristics of a projection surface in an image, e.g., based on the shape or angle of the screen or wall surface in the image. The image here may be the one picked up by an image pickup device such as CCD (Charge-Coupled Device) camera equipped in the projector, for example. Still alternatively, the projector may be provided with a gravity sensor to directly acquire the projection angle ϕ.

In step S108, based on the projection angle acquired in step S106, the reference formation area determination section 434 determines a reference formation area corresponding to the reference display area WSs.

Figure 7:
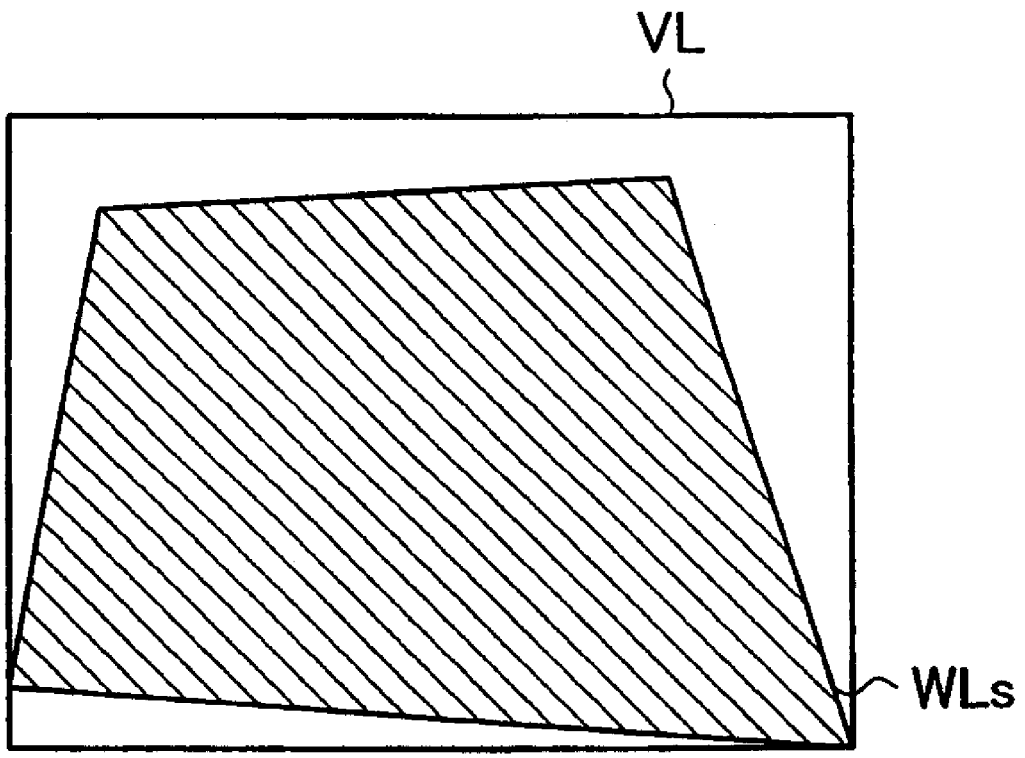
FIG. 7 is an illustrative diagram showing a reference formation area WLs.

FIG. 7 is an illustrative diagram showing the reference formation area WLs. The reference formation area WLs is formed with a virtual distorted image for formation on the liquid crystal light valve 300 when a rectangular image is displayed in the reference display area WSs of FIG. 6. The reference formation area WLs is larger than the liquid crystal light valve 300. That is, in step S108, the reference formation area WLs is determined on a virtual liquid crystal light valve VL.

As already described, the aspect ratio of the reference display area WSs is dependent on the allowable range of the projection system. Accordingly, the shape of the reference formation area WLs is also dependent on the allowable range of the projection system. The aspect ratio of the virtual liquid crystal light valve VL is the same as that of the reference display area WSs, and is dependent on the allowable range of the projection system.

In this embodiment, the reference formation area WLs is determined using a table. More specifically, the reference formation area determination section 434 is provided with a table TB, which carries therein a plurality of potential reference formation areas corresponding to a plurality of combinations of the projection angles ϕ and θ. Based on the projection angles ϕ and θ acquired in step S106, one potential reference formation area is selected as a reference formation area.

The potential reference formation areas stored in the table TB are determined by the following transformation equation, i.e., equation 1.

Equation 1

Herein, the xyz coordinate system is the coordinate system of the screen SC (refer to FIGS. 2A and 2B). The coordinates of (x, y, z) are those before transformation in the xyz coordinate system, and the coordinates of (x', y', z') are those after transformation therein. The XY coordinate system is that of the virtual liquid crystal light valve VL.

The table TB actually carries therein coordinates of every potential reference formation area, i.e., their coordinates of points at four corners. The coordinates of such four-corner points of the respective potential reference formation areas are derived by substituting the four-corner point coordinates of the reference display area WSs in x and y of the equation 1, and by substituting the distance from the projector PJ to the reference display area WSs in z of the equation 1.

The values of x, y, and z of the equation 1 are determined as below, for example. Assumed here is that the liquid crystal light valve 300 is of XGA (1024 by 768 pixels) in size, and the reference display area WSs after the projection system is moved in the allowable range is 2048 by 1536 pixels in size. When the reference display area WSs is set to the size of 2048 cm by 1536 cm, the values of x and y are determined for the four-corner points of the reference display area WSs. Also determined is such a distance z that can lead to the reference display area WSs having the size of 2048 cm by 1536 cm. Alternatively, by measuring the size of the reference display area WSs with the distance z set to 1 m, the values of x and y may be determined for the four-corner points of the reference display area WSs. In the equation 1, the values of x' and y' are cancelled to the lowest terms by the value of z' at the time of transformation into the two-dimensional XY coordinate system. Accordingly, when the values of x and y are set depending on the value of z, and when the values of z is set depending on the values of x and y, the shape (and the size) of the reference formation area WLs will be the same.

In step S110 of FIG. 5, based on the correspondence between the reference display area WSs and the reference formation area WLs, the target formation area determination section 436 determines a transformation equation for use for projection transformation.

Figure 8A:
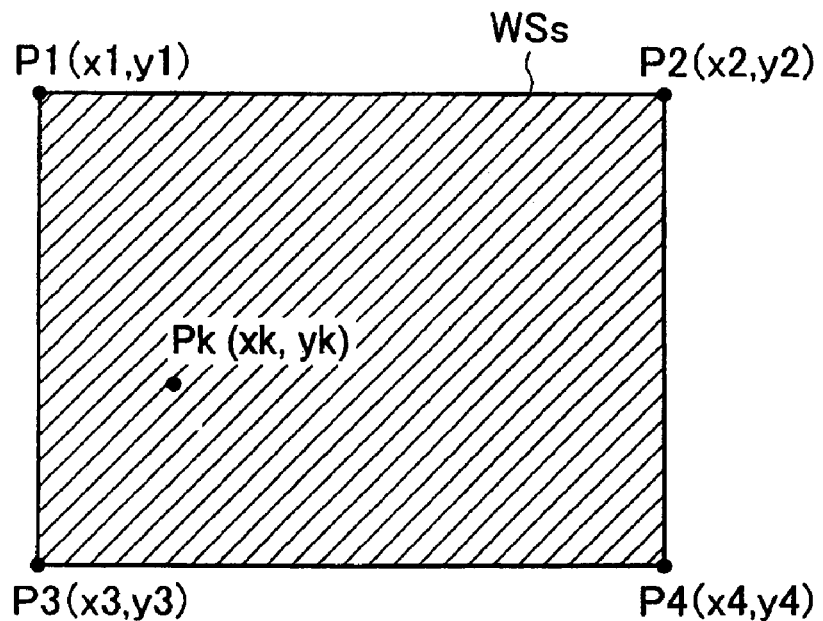
FIGS. 8A and 8B are illustrative diagrams showing, respectively, a reference display area WSs and the reference formation area WLs.
Figure 8B:
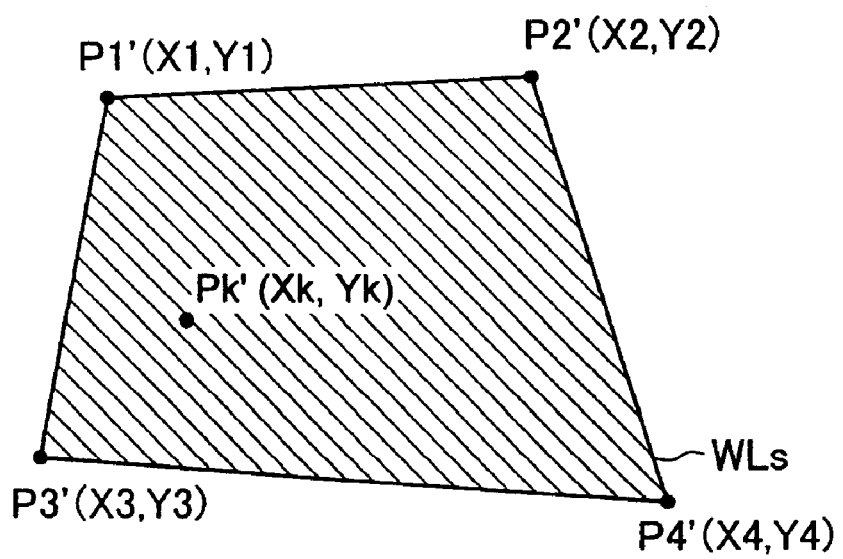

FIGS. 8A and 8B are illustrative diagrams showing, respectively, the reference display area WSs and the reference formation area WLs. There are correspondences between points of P1(x1, y1) to P4(x4, y4) at four corners of the reference display area WSs, and points of P1'(X1, Y1) to P'4(X4, Y4) at four corners of the reference formation area WLs.

The transformation equation, i.e., equation 2, is derived based on the correspondences of FIGS. 8A and 8B.

Equation 2

In the equation 2, a to h are all a constant. These constants of a to h are derived by solving simultaneous equations (eight equations), i.e., by substituting the coordinates of the four-corner points P1 to P4 of the reference display area WSs in (x, y), and by substituting the four-corner points P1' to P4' of the reference formation area WLs in (X, Y).

Utilizing the transformation equation (equation 2) as a result of step S110 can derive a point Pk'(Xk, Yk) in the reference formation area WLs corresponding to any arbitrary point Pk(xk, yk) in the reference display area WSs.

In step S112 of FIG. 5, utilizing the transformation equation as a result of step S110, the target formation area determination section 436 determines a target formation area corresponding to the target display area WSt.

Figure 9A:
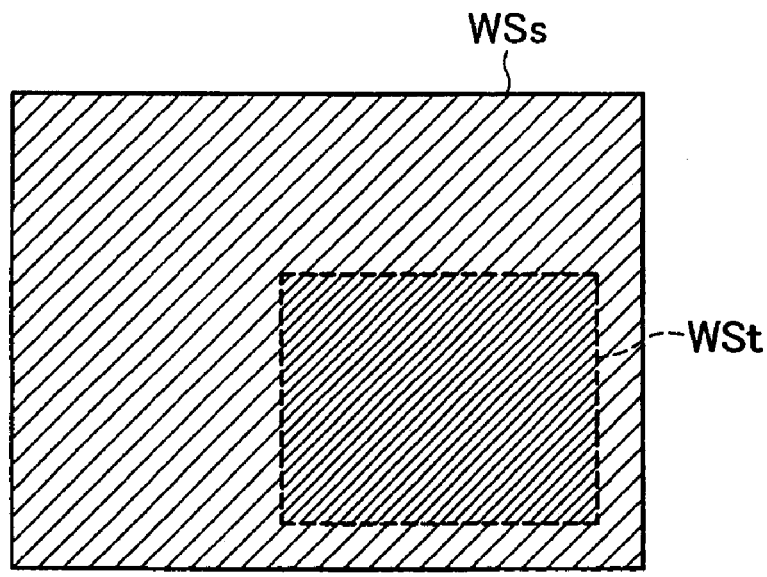
FIGS. 9A and 9B are illustrative diagrams showing, respectively, the target display area WSt and a target formation area WLt.
Figure 9B:
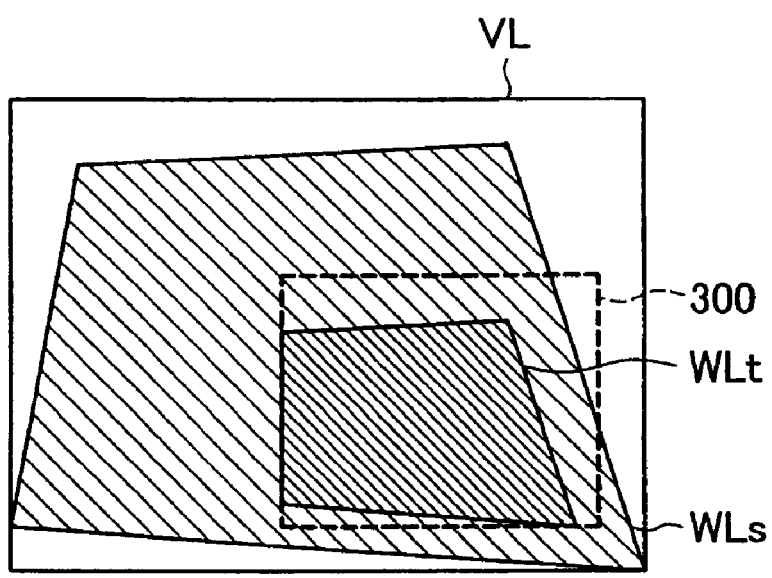

FIGS. 9A and 9B are illustrative diagrams showing, respectively, the target display area WSt and the target formation area WLt. FIG. 9A shows the target display area WSt in the reference display area WSs. FIG. 9B shows a target formation area WLt in the reference formation area WLs together with the liquid crystal light valve 300. When the target formation area WLt in the liquid crystal light valve 300 of FIG. 9B is formed with a distorted image, a regular image is displayed in the target display area WSt of FIG. 9A.

As is known from comparison between FIGS. 9A and 9B, by equalizing the size of the reference display area WSs and the size of the virtual liquid crystal light valve VL, the positional relationship between the virtual liquid crystal light valve VL and the actual liquid crystal light valve 300 is the same as that between the reference display area WSs and the target display area WSt.

In step S114 of FIG. 5, the correction application section 438 corrects original image data in such a manner as to form a distorted image in the target formation area WLt on the liquid crystal light valve 300. The result derived by such correction is corrected image data.

The correction in step S114 is applied using the transformation equation (equation 2) derived in step S110. More specifically, assumed here is that the target display area WSt carries therein an original image represented by the original image data, and the target formation area WLt carries therein a distorted image represented by the corrected image data. In accordance with the transformation equation (equation 2), an attention pixel in the original image is determined with its corresponding pixel in the distorted image. Thus determined corresponding pixel is assigned with a pixel value of the attention pixel. At this time, it is preferable if an interpolation process is executed as appropriate.

The corrected image data generated by the distortion correction section 430 as such is supplied to the liquid crystal light valve 300 by the image processing section 420. As a result, the target display area WSt on the screen displays a regular image.

As described in the foregoing, in this embodiment, exemplified is the projector in which the projection system can be changed in position. In this embodiment, utilizing the transformation equation (equation 2) determined based on the relationship between the reference display area WSs and the reference formation area WLs, the target formation area WLt corresponding to the target display area WSt is determined. The original image data is then so corrected that the target formation area WLt is formed with a distorted image, and the corrected image data is generated. That is, in this embodiment, in consideration of the target display area WSt determined based on the shift and zoom positions of the projection system, the corrected image data is generated so that any distortion observed in images displayed on the screen can be corrected with accuracy.

A-4. Modified Example of First Embodiment

Although the target formation area WLt is fit in the liquid crystal light valve 300 in FIG. 9B, this is not always the case. Described here is the process of a case with no fit. For comparison, however, described first is the process in a case where the target formation area fits in the liquid crystal light valve 300. For the sake of description, exemplified below is a case where the pan angle θ is 0 degree (refer to FIGS. 2A and 2B).

Figure 10A:
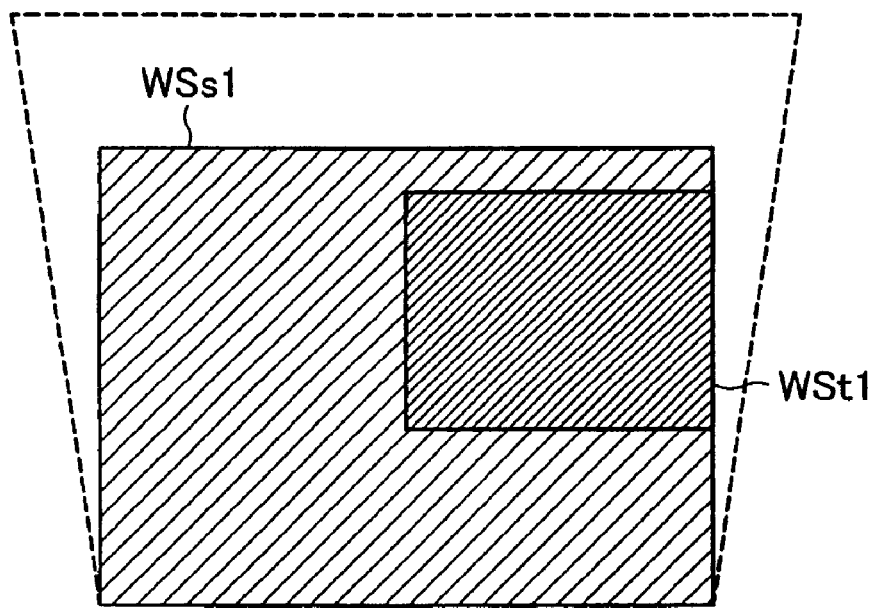
FIGS. 10A and 10B are each an illustrative diagram showing a process when the target formation area fits in the liquid crystal light valve.
Figure 10B:
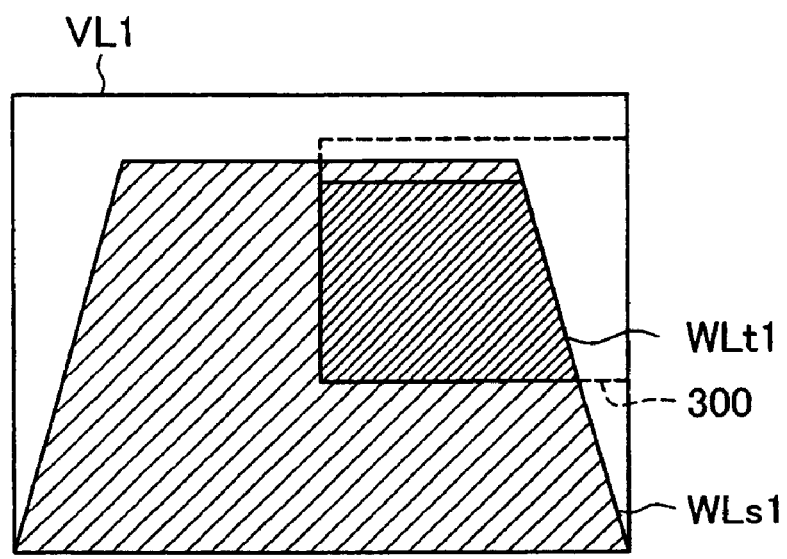

FIGS. 10A and 10B are each an illustrative diagram showing the process in a case where a target formation area fits in a liquid crystal light valve. FIG. 10A shows a target display area WSt1 in a reference display area WSs1, and FIG. 10B shows a target formation area WLt1 in a reference formation area WLs1.

In FIG. 10B, the liquid crystal light valve 300 is including therein the target formation area WLt1. Therefore, as described in the first embodiment, by forming a distorted image in the target formation area WLt1 of the liquid crystal light valve 300, the target display area WSt1 of FIG. 10A displays a regular image.

Note that, in FIG. 10A, the area indicated by dashed lines outside of the reference display area WSs1 denotes an image display area on the screen when a rectangular image is displayed on the virtual liquid crystal light valve VL1. The image on the screen is expanding toward upward.

Figure 11:
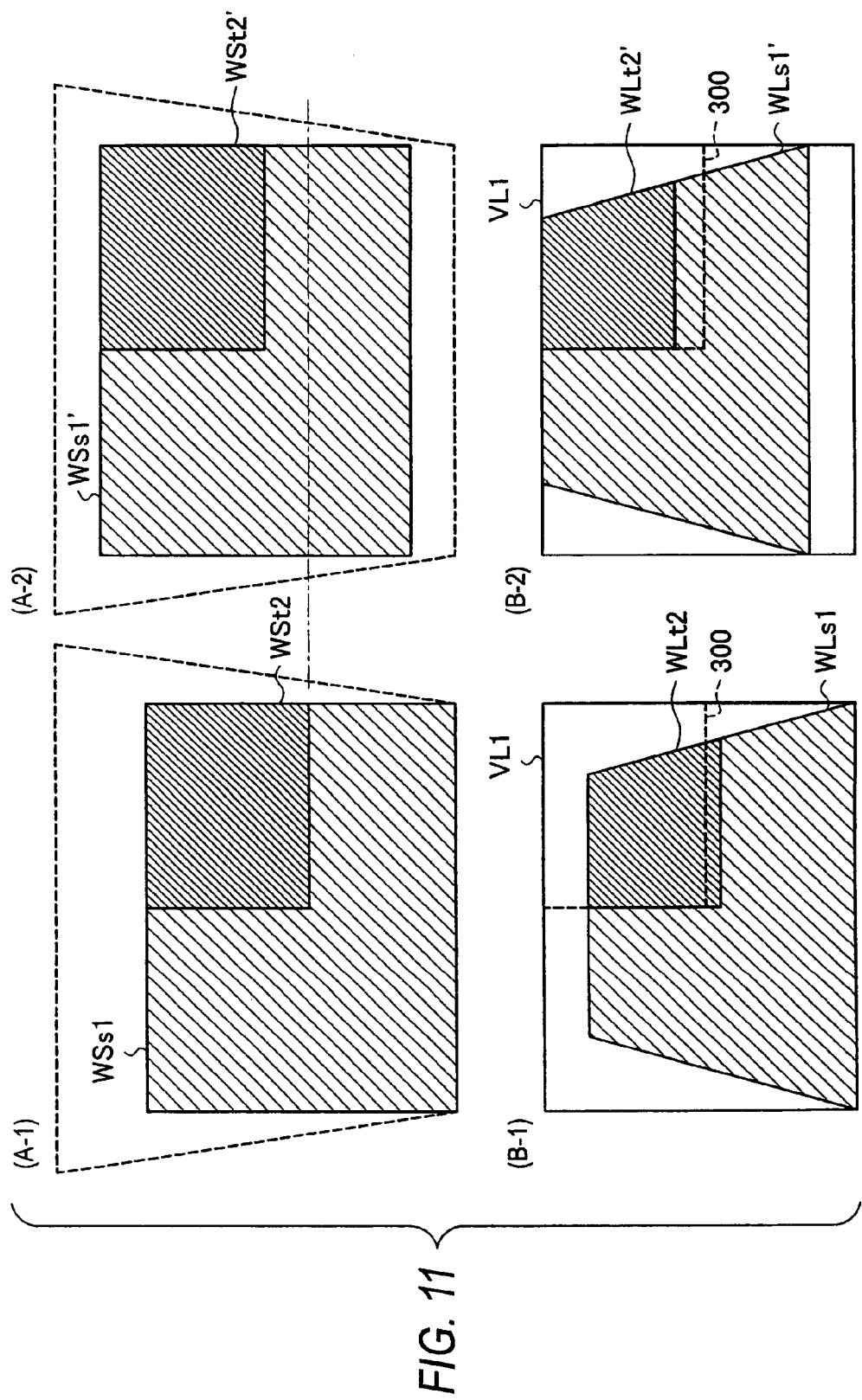

FIGS. 11A-1 to 11B-2 are illustrative diagram each showing a first process in a case where a target formation area does not fit in a liquid crystal light valve. FIGS. 11A-1 and 11A-2 show target display areas WSt2 and WSt2' in the reference display areas WSs1 and WSs1', respectively. FIGS. 11B-1 and 11B-2 show target formation areas WLt2 and WLt2' in the reference formation areas WLs1 and WLs1', respectively.

As is known from comparison between FIGS. 10A and 11A-1, the target display area WSt2' of FIG. 11A-1 is located upper than the target display area WSt2 of FIG. 10A. That is, FIGS. 11A-1 and 10A show cases of varying shift position of the projection system 340. In these cases, as shown in FIG. 11B-1, the liquid crystal light valve 300 is not including the lower side portion of the target formation area WLt2. Therefore, if the target formation area WLt2 in the liquid crystal light valve 300 is formed with a distorted image, the target display area WSt2 of FIG. 11A-1 does not display a perfect image but an imperfect image having no lower side portion.

In consideration thereof, in the first process, as shown in FIG. 11B-2, the reference formation area WLs1' in the virtual liquid crystal light valve VL1 is changed in position toward upward. In other words, the reference formation area WLs1' is changed in position with respect to the liquid crystal light valve 300. As a result, the liquid crystal light valve 300 includes therein the target formation area WLt2' so that the target display area WSt2' of FIG. 11A-2 is displayed with a perfect image. Note that, because the reference formation area WLs1' of FIG. 11B-2 is changed in position toward upward, as shown in FIG. 11A-2, the position of the reference display area WSs1' is changed to come upper than the reference display area WSs1 of FIG. 11A-1. As a result, as shown in FIG. 11A-2, the position of the target display area SWt2' is changed to come upper than the target display area WSt2 of FIG. 11A-1.

In FIG. 11B-2, the reference formation area WLs1' is changed in position, and the shape thereof is different from that of the reference formation area WLs1 of FIG. 11A-2. More specifically, the shape of the reference formation area WLs1' of FIG. 11B-2 is derived by subjecting the reference display area WSs1' of FIG. 11A-2 to projection transformation utilizing the transformation equation (equation 2) as a result of step S110. The shape of the target formation area WLt2' of FIG. 11B-2 is derived by subjecting the target display area WSt2' of FIG. 11A-2 to projection transformation utilizing the transformation equation (equation 2) as a result of step S110.

As is known from the above, at the time of the first process, actually, the target display area WSt2 may be changed in position so as to make the target formation area WLt2' corresponding to the resulting target display area WSt2' fit in the liquid crystal light valve 300. There is thus no need to derive the reference formation area WLs1' after the change. That is, in the first process, in step S112, when determining that the target formation area WLt2 does not fit in the liquid crystal light valve 300, the target formation area determination section 436 changes the position of the target display area WSt2 toward upward. Utilizing the transformation equation (equation 2) derived in step S110 based on the relationship between the reference display area WSs1 and the reference formation area WLs1, the target formation area determination section 436 then determines a new target formation area corresponding to the target display area WSt2 after the position change.

Herein, through comparison between the coordinates of the liquid crystal light valve 300 in the XY coordinate system and the coordinates of the target formation area, it can be determined whether or not the target formation area fits in the liquid crystal light valve 300.

Figure 12:
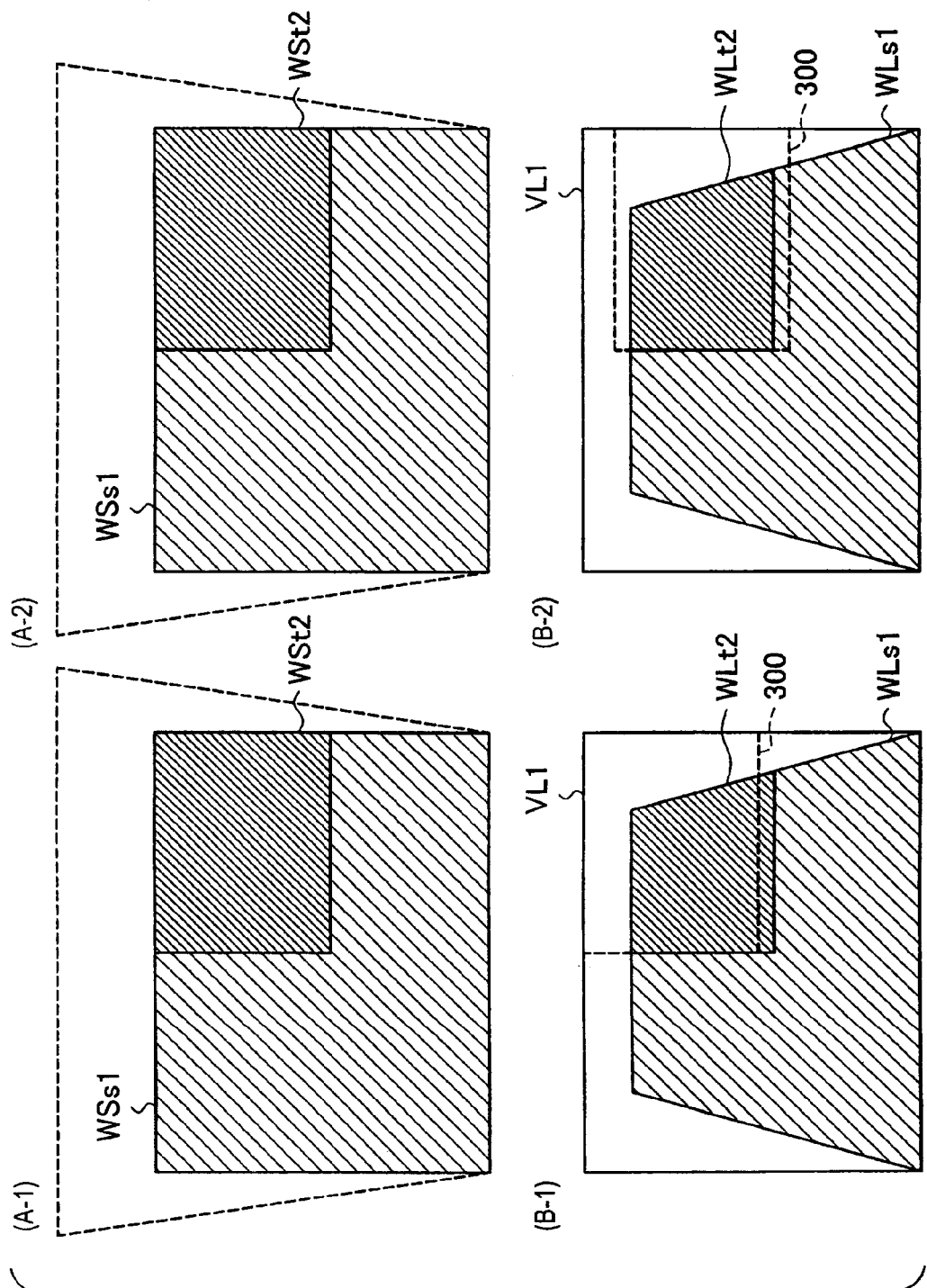

FIGS. 12A-1 to 12B-2 are all an illustrative diagram showing a second process in a case where a target formation area does not fit in a liquid crystal light valve. FIGS. 12A-1 and 12A-2 are both showing the target display area WSt2 in the reference display area WSs1, and FIGS. 12B-1 and 12B-2 are both showing the target formation area WLt2 in the reference formation area WLs1. FIGS. 12A-1 and 12B-1 are the same as FIGS. 11A-1 and 11B-1.

As described by referring to FIGS. 11A-1 and 11B-1, in FIG. 12B-1, the liquid crystal light valve 300 is not including the lower side portion of the target formation area WLt2. Therefore, if the target formation area WLt2 in the liquid crystal light valve 300 is formed with a distorted image, the target display area WSt2 of FIG. 12A-1 does not display a perfect image but an imperfect image having no lower side portion.

In consideration thereof, in the second process, as shown in FIG. 12B-2, the target formation area WLt2 in the liquid crystal light valve 300 is changed in position toward upward. In other words, the liquid crystal light valve 300 in the virtual liquid crystal light valve VL1 is changed in position toward downward. As a result, the liquid crystal light valve 300 includes therein the target formation area WLt2. However, changing the position of the target formation area WLt2 in the liquid crystal light valve 300 is not enough, and the target display area is resultantly changed in position toward upward. Therefore, in the second process, by moving the projection system in shift position toward downward, a regular image is displayed in the target display area WSt2 of FIG. 12B-2.

Unlike FIG. 11B-2, in FIG. 11B-2, the reference formation area WLs1 is not changed in position, and the target formation areas WLt2 of FIGS. 12B-1 and 12B-2 share the same shape. Accordingly, at the time of the second process, unlike the time of the first process, there is no need to derive again the target formation area. That is, in the second process, in step S112, when determining that the target formation area WLt2 does not fit in the liquid crystal light valve 300, the target formation area determination section 436 changes the position of the target display area WLt2 in the liquid crystal light valve 300 toward upward. The target formation area determination section 436 also makes the projection system adjustment section 350 change the shift position of the projection system 340 toward downward. As is known from this, the projection system adjustment section 350 in the second process is equivalent to an actuator in the invention.

B. Second Embodiment

B-1. Configuration of Projector

Figure 13:
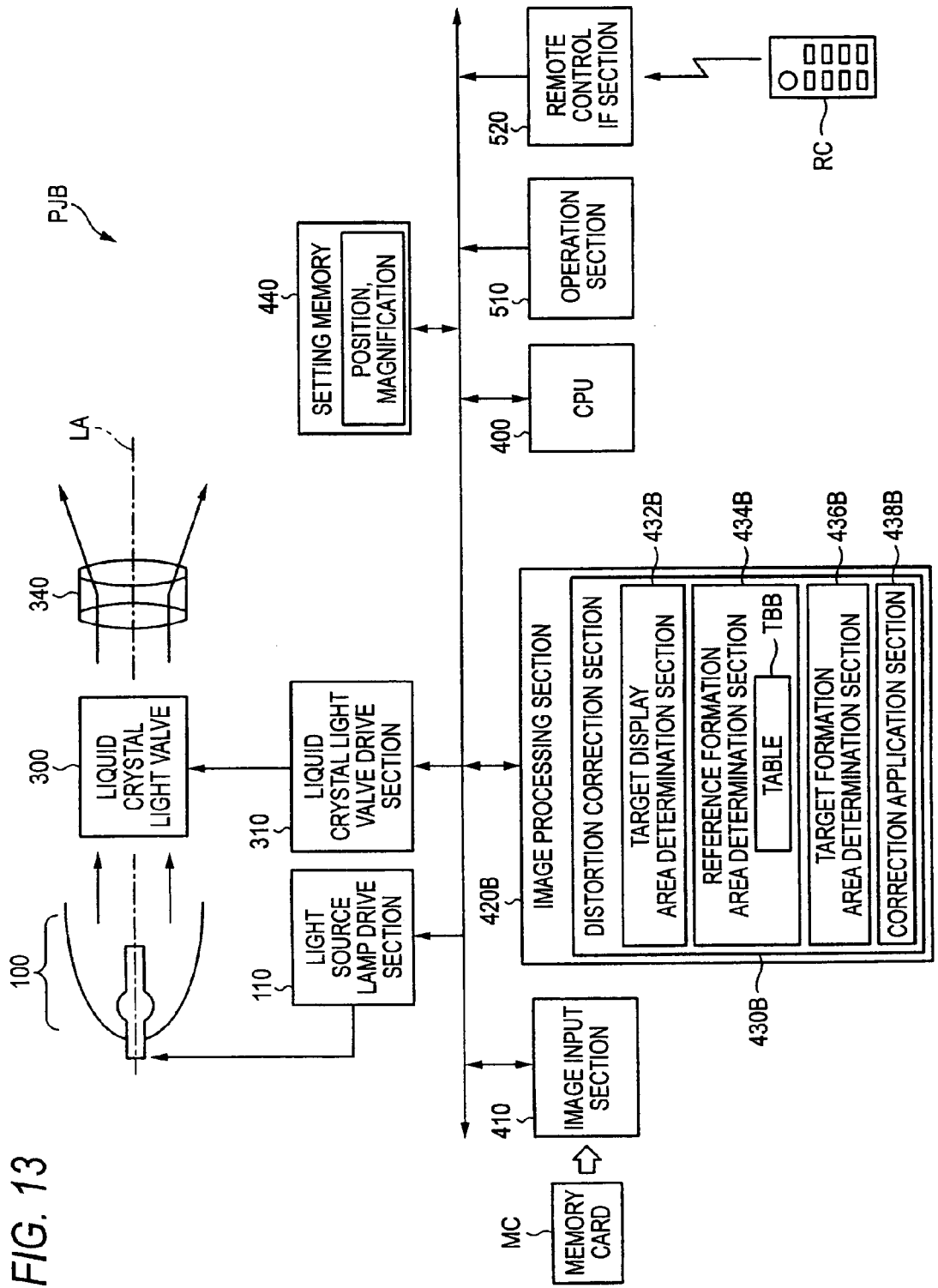
FIG. 13 is a block diagram showing the configuration of a projector PJB in a second embodiment.

FIG. 13 is a block diagram showing the configuration of a projector PJB in a second embodiment. FIG. 13 is almost the same as FIG. 1 except for an image processing section 420B, more specifically, a distortion correction section 430B. In this embodiment, a setting memory 440 is provided as alternatives to the projection system adjustment section 350, the shift position detection section 362, and the zoom position detection section 364 in FIG. 1.

The setting memory 440 is storing setting values, indicating the position and magnification of a distorted image for formation on the liquid crystal light valve 300. The position and magnification of a distorted image for formation on the liquid crystal light valve 300 specify the position and magnification of a regular image for display on the screen. The setting value for the position is represented by the movement direction and amount from any predetermined position of a distorted image in the liquid crystal light valve. In this embodiment, as the setting value for the magnification, a value smaller than 1 is presumably set. The position and magnification of the distorted image are set through user operation of the operation section 510, and the results are stored in the setting memory 440.

B-2. Image Distortion on Screen Display

When low-angle image projection is made onto a screen, if a distorted image is first formed on a liquid crystal light valve for the purpose of displaying a regular image on the screen, and if a formation area for the resulting distorted image is then changed, i.e., if the resulting distorted image is changed in position and magnification in the liquid crystal light valve, the resulting image on the screen is distorted. This is caused because the image display area on the screen is changed as the formation area is changed for the distorted image in the liquid crystal light valve.

Figure 14A:
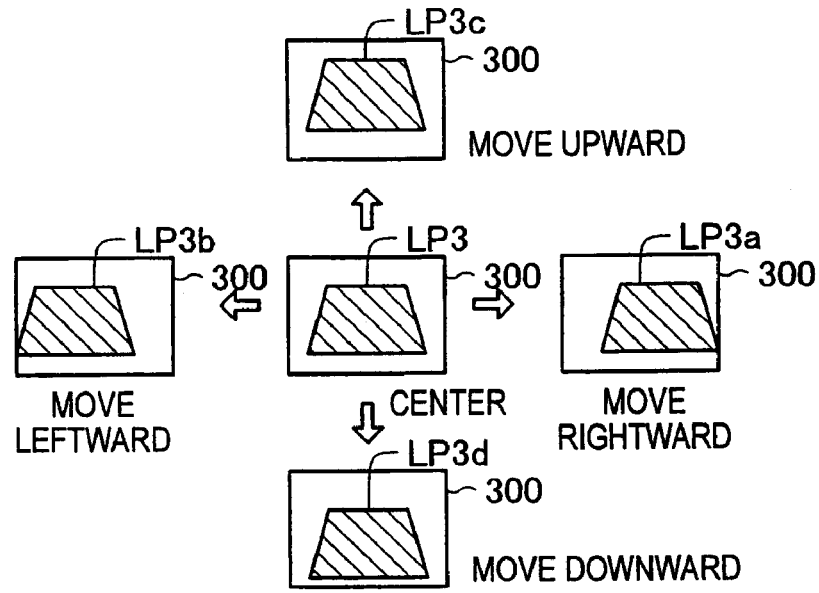
FIGS. 14A and 14B are illustrative diagrams showing, respectively, an image formed on a liquid crystal light valve, and an image displayed on a screen based on the position of the image.
Figure 14B:
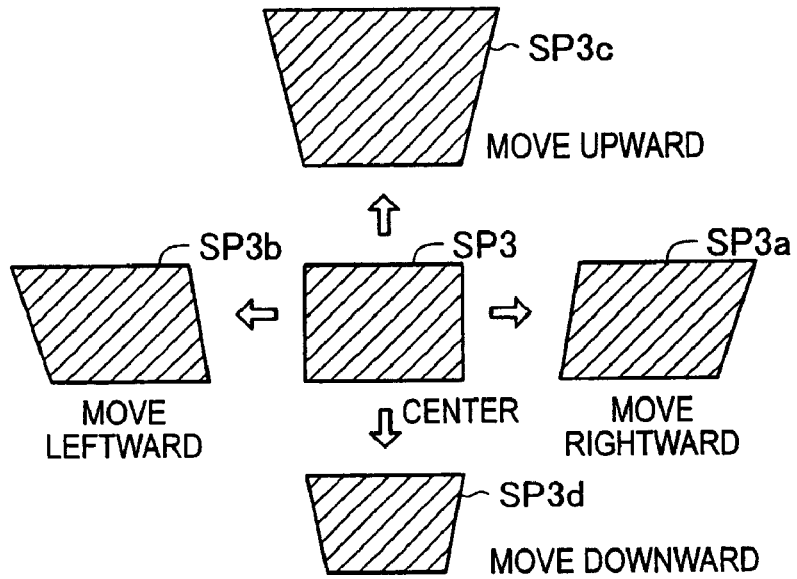

FIGS. 14A and 14B are illustrative diagrams showing, respectively, an image formed on a liquid crystal light valve, and an image displayed on the screen depending on the position of the image. When the liquid crystal light valve 300 is formed, at its center portion, with a trapezoidal distorted image LP3 of FIG. 14A, the screen displays an image SP3 of FIG. 14B. Thereafter, without changing the shape of the distorted image LP3 formed in the liquid crystal light valve 300, when distorted images LP3a to PL3d are formed at each different position in the liquid crystal light valve 300 as shown in FIG. 14A, the distorted images SP3a to SP3d are changed in position on the screen as shown in FIG. 14B. As a result, the images SP3a to SP3d are all changed in shape. For example, if the liquid crystal light valve 300 is formed with the distorted image LP3a on the right side, the screen displays the distorted image SP3a extending toward right.

Figure 15A:
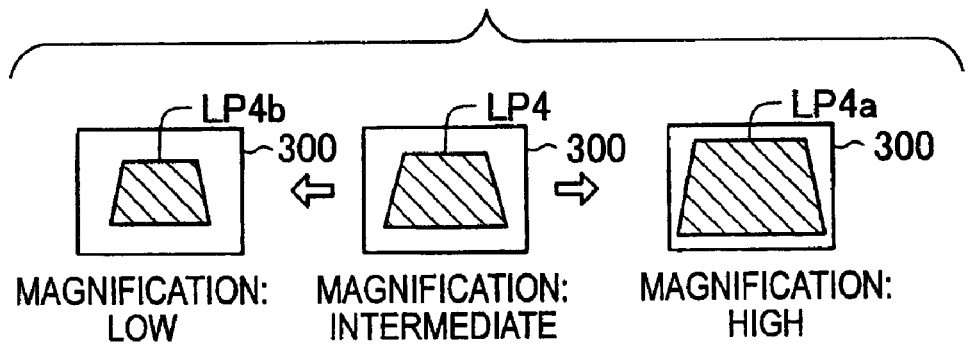
FIGS. 15A and 15B are illustrative diagrams showing, respectively, an image formed on the liquid crystal light valve, and an image displayed on the screen based on the magnification of the image.
Figure 15B:
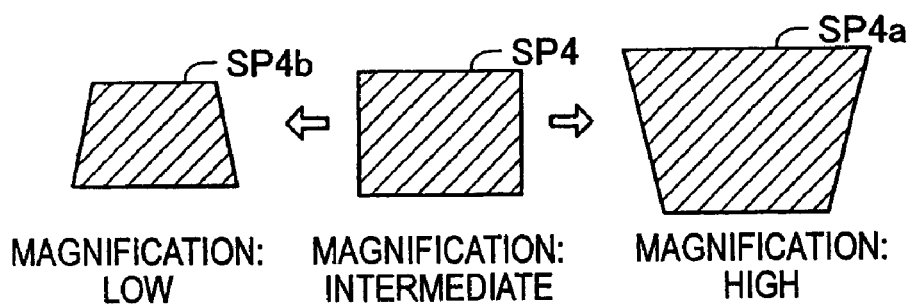

FIGS. 15A and 15B are illustrative diagrams showing, respectively, an image formed on a liquid crystal light valve, and an image displayed on the screen depending on the magnification of the image. When the liquid crystal light valve 300 is formed with a trapezoidal distorted image LP4 with the intermediate magnification of FIG. 15A, the screen displays an image SP4 of FIG. 15B. Thereafter, if distorted images LP4a and LP4b are formed with each different magnification (size) as shown in FIG. 15A while the distorted image LP4 formed in the liquid crystal light valve 300 being similar in shape, the images SP4a and SP4b are changed in size for display on the screen as shown in FIG. 15B. As a result, the images SP4a and SP4b are both changed in shape. For example, the liquid crystal light valve 300 is formed with a distorted image LP4b with the relatively-high magnification, the screen displays the image SP4b expanding toward upward.

As described in the foregoing, when the image display area is changed on the screen by changing the position and magnification of a distorted image to be formed on the liquid crystal light valve 300, the image to be displayed on the screen is changed in shape.

The issue here is that, when the distorted image is determined by shape for formation on the liquid crystal light valve 300, no consideration has been given to the position and magnification of the distorted image. In other words, previously, the image display area on the screen has not been considered. Therefore, it has been difficult to display on the screen rectangular images (regular images) of a correct aspect ratio.

In consideration thereof, in this embodiment, in consideration of the image display area on the screen, i.e., the position and magnification of a distorted image to be formed on a liquid crystal light valve, a distorted image is determined by shape for formation on the liquid crystal light valve.

B-3. Correction of Image Distortion

Figure 16:
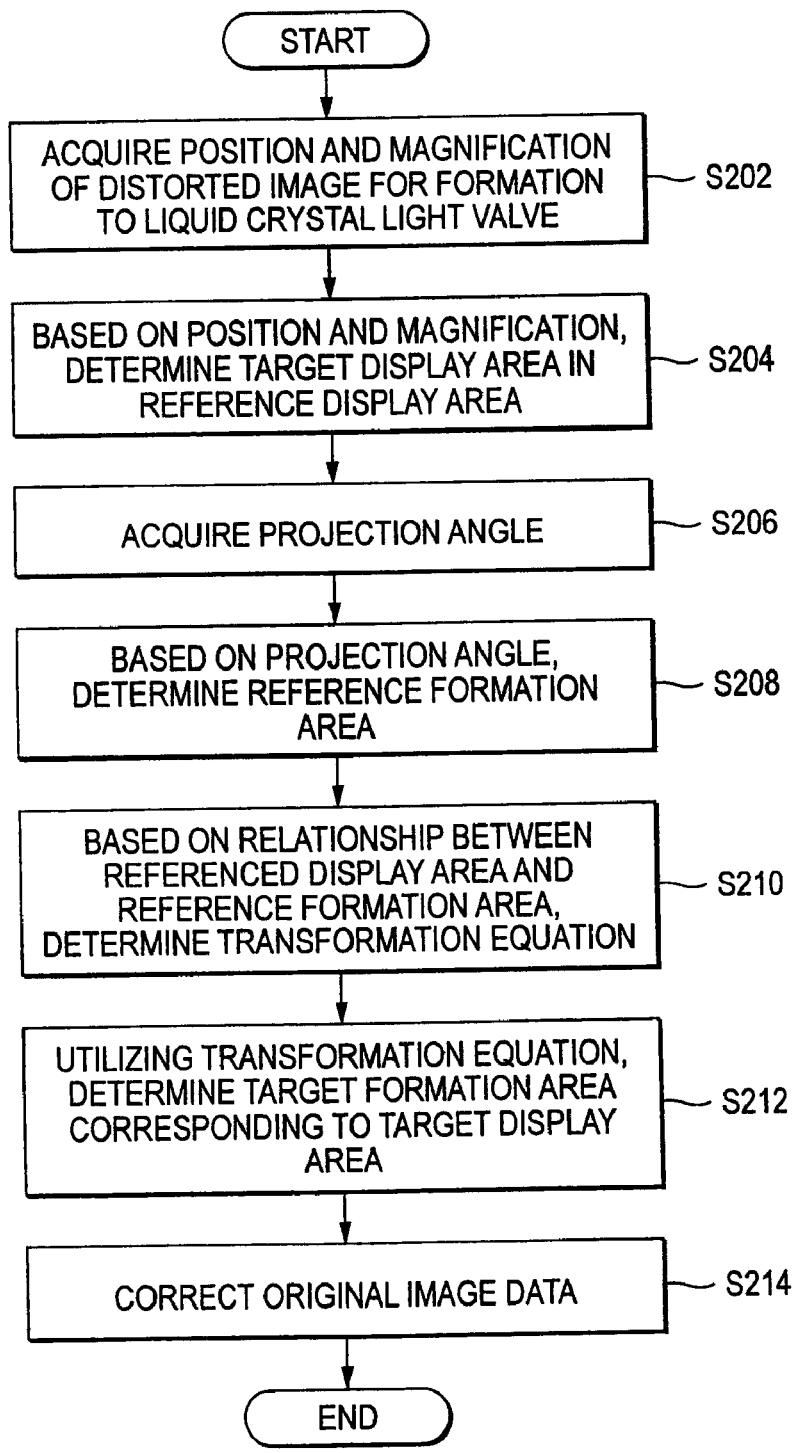
FIG. 16 is a flowchart showing the procedure of correcting any distortion observed in an image displayed on the screen.

FIG. 16 is a flowchart showing the procedure of correcting any distortion observed in an image displayed on a screen. In a similar manner to the first embodiment (FIG. 5), the procedure of FIG. 16 is executed by the distortion correction section 430B, and is started when a command is issued for a distortion correction process in response to the user operation of the operation section 510, for example.

In step S202, a target display area determination section 432B acquires the position and magnification of a distorted image to be formed on a liquid crystal light valve. More in detail, the target display area determination section 432B reads the setting value (current value) showing the formation position of a distorted image stored in the setting memory 440, and reads the setting value (current value) showing the formation magnification of the distorted image.

In step S204, similarly to step S104 of FIG. 5, based on the setting values (current values) for the position and magnification of the distorted image acquired in step S102, the target display area determination section 432B determines a display area, i.e., target display area, serving as a target of any image to be displayed on the screen.

Figure 17:
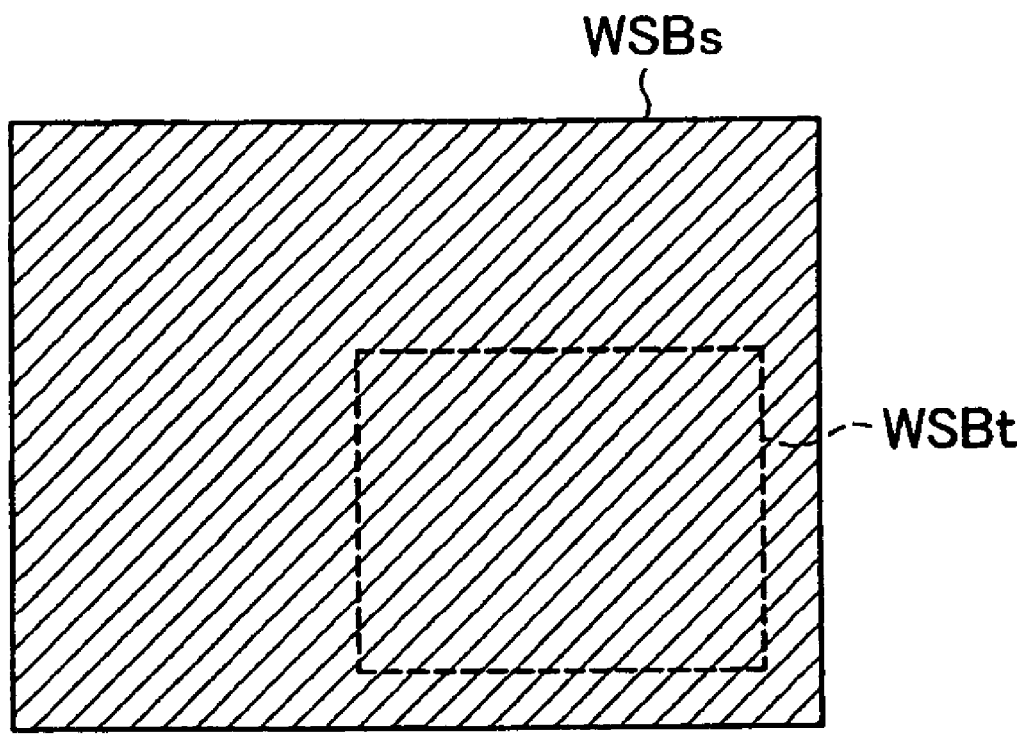
FIG. 17 is an illustrative diagram showing a target display area WSBt.

FIG. 17 is an illustrative diagram showing a target display area WSBt. FIG. 17 also shows a reference display area WSBs including therein the target display area WSBt. The reference display area WSBs displays therein an image when the distorted image is changed in position and magnification in the liquid crystal light vale in a possible range. The size of the reference display area WSBs is set irrespective of the projection angle of the projector, and is of the size when the tilt angle φ and the pan angle θ of the projector are both 0 degree. In this embodiment, the reference display area WSBs is ready in advance based on the possible range for the position and magnification of the distorted image. In step S204, based on the current values of the position and magnification of the distorted image in the liquid crystal light valve, the target display area WSBt is determined in the reference display area WSBs. As is known from this, the reference display area WSBs is an area including the target display areas corresponding to the positions and magnifications in the possible range of the distorted image to be formed in the liquid crystal light valve 300.

The reference display area WSBs and the target display area WSBt are both rectangle shaped. The aspect ratio of the reference display area WSBs, and the aspect ratio of the target display area WSt are the same as that of the liquid crystal light valve 300, e.g., in this embodiment, 4:3.

In step S206 of FIG. 16, similarly to step S106 of FIG. 5, the reference formation area determination section 434B acquires the projection angle of the projector.

In step S208, similarly to step S108 of FIG. 5, the reference formation area determination section 434B determines a reference formation area corresponding to the reference display area WSs based on the projection angle acquired in step S206.

Figure 18:
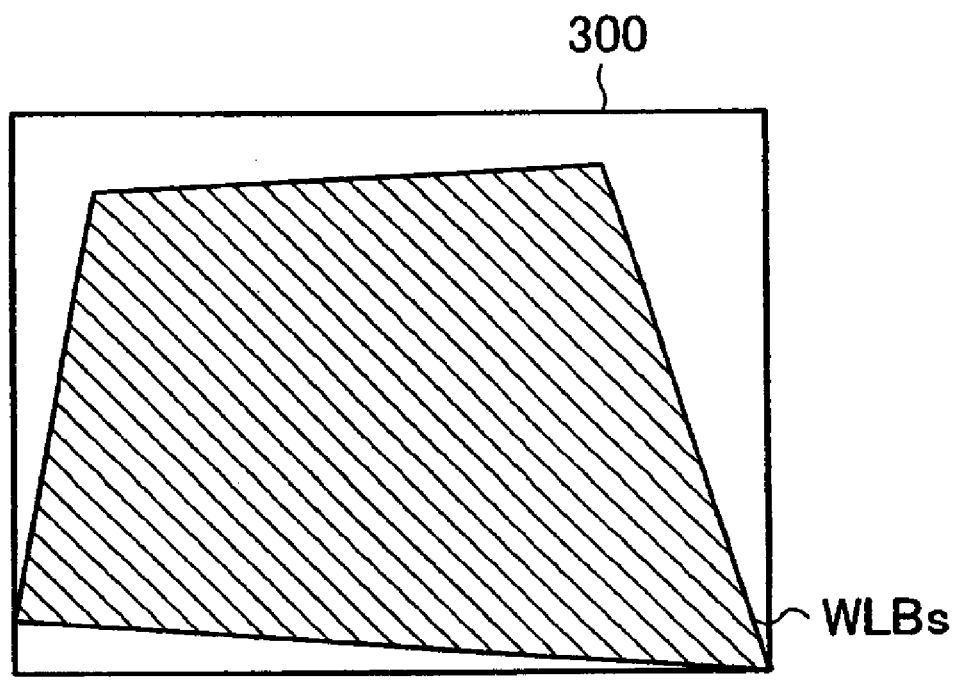
FIG. 18 is an illustrative diagram showing a reference formation area WLBs.

FIG. 18 is an illustrative diagram showing a reference formation area WLBs. The reference formation area WLBs is formed with a virtual distorted image to be formed on a liquid crystal light valve when the reference display area WSBs of FIG. 17 is formed with a rectangular image (regular image) of a correct aspect ratio. Note in this embodiment that, unlike the first embodiment, the reference formation area WLBs is smaller than the liquid crystal light valve 300. That is, in step S208, the reference formation area WLBs is formed on the actual liquid crystal light valve 300. Also in this embodiment, similarly to the first embodiment, the reference formation area WLBs is determined using a table TBB provided to the reference formation area determination section 434B.

In step S210 (FIG. 16), similarly to step S110 of FIG. 5, a target formation area determination section 436B determines a transformation equation for projection transformation based on the correspondence between the reference display area WSBs and the reference formation area WLBs. The transformation equation (refer to equation 2) is derived using coordinates of four-corner points of the reference display area WSBs and those of the reference formation area WLBs.

In step S212, similarly to step S112 of FIG. 5, the target formation area determination section 436B determines a target formation area corresponding to the target display area WSBt using the transformation equation derived in step S210.

Figure 19A:
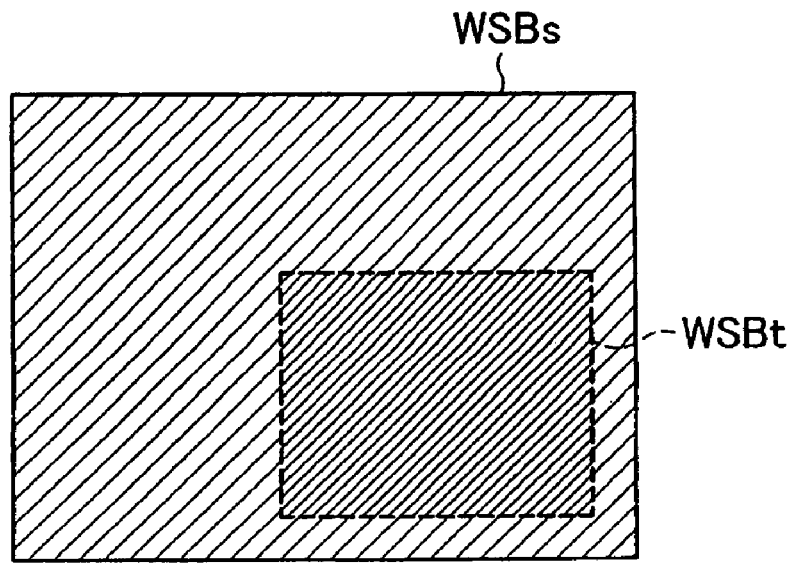
FIGS. 19A and 19B are illustrative diagrams showing, respectively, the target display area WSBt and a target formation area WLBt.
Figure 19B:
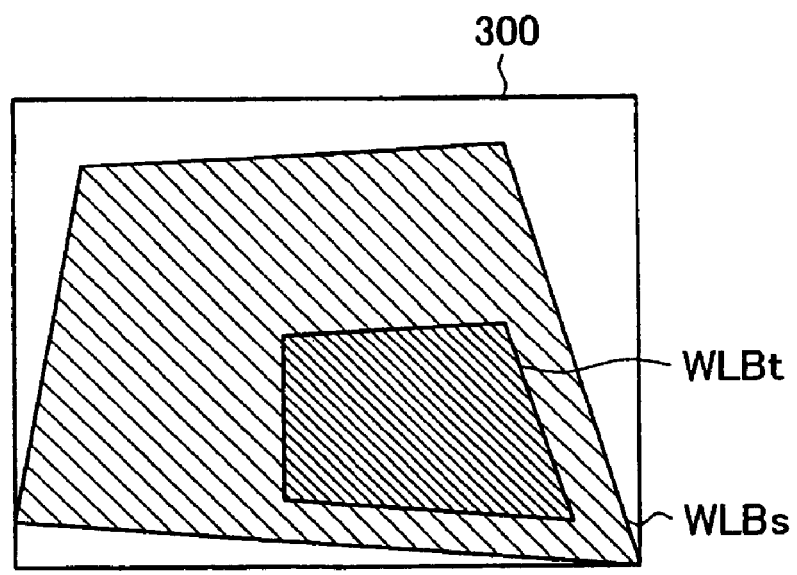

FIGS. 19A and 19B are illustrative diagrams showing, respectively, the target display area WSBt and the target formation area WLBt. FIG. 19A shows the target display area WSBt in the reference display area WSBs, and FIG. 19B shows the target formation area WLBt in the reference formation area WLBs together with the liquid crystal light valve 300. When the target formation area WLBt in the liquid crystal light valve 300 of FIG. 19B is formed with a distorted image, a regular image is displayed in the target display area WSBt of FIG. 19A.

In step S214 of FIG. 16, similarly to step S114 of FIG. 5, a correction application section 438B may correct original image data in such a manner that the target formation area WLBt on the liquid crystal light valve 300 is formed with a distorted image. As a result, generated is corrected image data.

The corrected image data generated by the distortion correction section 430B is supplied to the liquid crystal light valve 300 by the image processing section 420B. As a result, the target display area WSBt on the screen displays a regular image.

As described in the foregoing, in this embodiment, exemplified is the projector in which the position and magnification can be changed for a distorted image to be formed on the liquid crystal light valve. In this embodiment, utilizing the transformation equation (equation 2) determined based on the relationship between the reference display area WSBs and the reference formation area WLBs, the target formation area WLBt corresponding to the target display area WSBt is determined. The original image data is then so corrected that the target formation area WLBt is formed with a distorted image, and the correct image data is generated. That is, in this embodiment, in consideration of the target display area WSt determined based on the position and magnification of the distorted image in the liquid crystal light valve, the corrected image data is generated so that any distortion observed in images displayed on the screen can be corrected with accuracy.

In the modified example of the first embodiment, described is the process in a case where a target formation area does not fit in the liquid crystal light valve 300. In this embodiment, because the actual liquid crystal light valve 300 is used as an alternative to the virtual liquid crystal light valve VL of the first embodiment, such a problem is not caused.

The foregoing description is in all aspects illustrative and not restrictive, and it is understood that numerous other modifications and variations can be devised without departing from the scope of the invention. For example, the following modifications are possible.

1. A target display area is determined based on the shift and zoom positions of the projection system 340 in the first embodiment. Alternatively, as in the second embodiment, the target formation area may be determined based on the position and magnification of a distorted image to be formatted on the liquid crystal light valve 300.

With this being the case, a reference display area may be set to the area WSs similar to the first embodiment. The target display area may be set to a part of the area WSt in the first embodiment based on the shift and zoom positions of a projection system, and the position and magnification of a distorted image. The reference formation area may be set to the area WLs similar to the first embodiment. The target formation area may be set to a part of the area WLt in the first embodiment based on the relationship between the reference display area and the reference formation area.

2. The target formation area WLt is derived in step S112 in the first embodiment, but is not necessarily derived independently. That is, utilizing the transformation equation (equation 2) in step S114, the correction application section 438B may generate corrected data by correcting original image data in such a manner that an area (target formation area) in the liquid crystal light valve corresponding to the target display area is formed with a distorted image. Note here that if the target formation area determination section 436 is set to derive independently the target formation area WLt, as described in the modified example of the first embodiment, there is an advantage of making a determination whether or not the target formation area fits in the liquid crystal light valve 300 before the corrected image data is generated. Note here that, also in the second embodiment, similarly to the above, the target formation area WLBt is not necessarily derived independently.

The correction application section may correct any given original image data in such a manner that a distorted image is formed in a target formation area corresponding to a target display area that is determined generally based on the relationship between a reference display area and a reference formation area, and may generate corrected image data for supply to the image formation section 3. In the above embodiments, the projectors PJ and PJB are provided with the distortion correction sections 430 and 430B, respectively, and are equivalent to the image processing device and the projector in the invention. This is not surely restrictive, and the distortion correction section may be provided not to a projector but to a personal computer. With this being the case, the computer is equivalent to the image processing device of the invention.

4. In the above embodiments, the projectors may be provided with a micromirror-type light modulator such as DMD (Digital Micromirror Device) (trademark of Texas Instruments) as an alternative to a liquid crystal light valve. Alternatively, the projector may be provided with a high-intensity CRT (Cathode-Ray Tube), a plasma display panel, an electroluminescent display panel, a light-emitting diode display panel, a field emission display panel, and the like. As such, the image formation section is exemplified by an involuntary or voluntary emission device.

5. In the above embodiments, the configuration implemented by hardware may be replaced by software, or the configuration implemented by software may be replaced by hardware.

What is claimed is:

1. A projector comprising:
an image formation section that emits light of an image;
a projection system that projects the emitted light onto a projection surface as a projected image;
a zoom position detection section that acquires a zoom position of the projection system;
a projection angle detection section that acquires a projection angle of the projector with respect to the projection surface;
a target formation area determination section that determines, based on information about the zoom position and the projection angle, a target formation area in the image formation section so that the distortion-free image is displayed on the projection surface; and
a correction application section that generates corrected image data for supply to the image formation section by correcting any provided original image data to form a target image in the target formation area so that a distortion-free image is displayed on the projection surface.

2. A projector comprising:
an image formation section that emits light of an image;
a projection system that projects the emitted light onto a projection surface as a projected image;
a shift position detection section that acquires a shift position of the projection system;
a projection angle detection section that acquires a projection angle of the projector with respect to the projection surface;
a target formation area determination section that determines, based on information about the shift position and the projection angle, a target formation area in the image formation section so that the distortion-free image is displayed on the projection surface; and
a correction application section that generates corrected image data for supply to the image formation section by correcting any provided original image data to form a target image in the target formation area so that a distortion-free image is displayed on the projection surface.

3. The projector according to claim 2, wherein
when the target formation area does not fit in the image formation section,
the target formation area determination section newly determines the target formation area to ensure a fit in the image formation section.

4. The projector according to claim 2, further comprising:
an actuator for changing a shift position of the projection system, wherein
when the target formation area does not fit in the image formation section,
the target formation area determination section changes a position of the target formation area to ensure a fit in the image formation section, and causes the actuator to change the shift position of the projection system.

5. An image processing method for a projector including an image formation section that emits light of an image, and a projection system that projects the emitted light onto a projection surface as a projected image, the method comprising:
(a) acquiring a zoom position of the projection system;
(b) acquiring a projection angle of the projector with respect to the projection surface;
(c) determining, based on information about the zoom position and the projection angle, a target formation area in the image formation section so that a distortion-free image is displayed on the projection surface; and
(d) generating corrected image data for supply to the image formation section by correcting any provided original image data to form a target distorted image in the target formation area so that the distortion-free image is displayed on the projection surface.

6. An image processing method for a projector including an image formation section that emits light of an image, and a projection system that projects the emitted light onto a projection surface as a projected image, the method comprising:
(a) acquiring a shift position of the projection system;
(b) acquiring a projection angle of the projector with respect to the projection surface;
(c) determining, based on information about the shift position and the projection angle, a target formation area in the image formation section so that a distortion-free image is displayed on the projection surface; and
(d) generating corrected image data for supply to the image formation section by correcting any provided original image data to form a target distorted image in the target formation area so that the distortion-free image is displayed on the projection surface.

7. The image processing method according to claim 6, further comprising:
(e) newly determining the target formation area to ensure a fit in the image formation section, when the target formation area does not fit in the image formation section.

8. The image processing method according to claim 6, the projector further includes an actuator for changing a shift position of the projection system, the method further comprising:
(e) changing a position of the target formation area to ensure a fit in the image formation section, and making the actuator change the shift position of the projection system, when the target formation area does not fit in the image formation section.

* * * * *